United States Patent [19]

Willus et al.

[11] Patent Number: 4,525,274
[45] Date of Patent: Jun. 25, 1985

[54] FILTRATE DISCHARGE SYSTEM FOR PRESSURE FILTER

[75] Inventors: Charles A. Willus, Newtown; Vaino J. Kosonen, West Redding, both of Conn.; Dale R. Sanchez, Orillia, Canada

[73] Assignee: Dorr-Oliver Incorporated, Stamford, Conn.

[21] Appl. No.: 597,780

[22] Filed: Apr. 6, 1984

[51] Int. Cl.³ .................... B01D 29/24; B01D 29/38
[52] U.S. Cl. .................... 210/232; 210/323.2; 210/333.01; 210/333.1; 210/341; 210/928; 162/30.11
[58] Field of Search ............... 210/779, 791, 797, 798, 210/805, 808, 232, 312, 313, 323.2, 332, 333.1, 333.01, 411, 340, 412, 341, 409, 416.1, 456, 540, 928; 162/30.11

[56] References Cited

U.S. PATENT DOCUMENTS

| Re. 27,163 | 8/1971 | Asper | 210/333.01 |
|---|---|---|---|
| 1,359,162 | 11/1920 | Genter | 210/333.1 |
| 2,681,153 | 6/1954 | Armbrust | 210/333.01 |
| 3,280,978 | 10/1966 | Scott | 210/333.01 |
| 3,356,215 | 12/1967 | Miles | 210/333.1 |
| 3,416,669 | 12/1968 | Hubbard | 210/333.1 |
| 3,443,690 | 5/1969 | Triesch | 210/333.01 |
| 4,243,533 | 1/1981 | Savolainen | 210/333.01 |
| 4,439,327 | 3/1984 | Muller | 210/333.1 |

FOREIGN PATENT DOCUMENTS

| 763256 | 7/1967 | Canada | 210/323.2 |
|---|---|---|---|
| 1461483 | 2/1969 | Fed. Rep. of Germany | 210/323.2 |
| 1088524 | 10/1967 | United Kingdom | 210/323.2 |

Primary Examiner—Ernest G. Therkorn
Attorney, Agent, or Firm—B. J. Kearns; G. R. Plotecher; L. W. Evans

[57] ABSTRACT

A low pressure filtration and thickening device comprising a tank having a plurality of suspended filter elements therein and a plurality of filtrate receiving compartments in the upper portion of the tank for receiving filtrate from the filter elements wherein a filtrate discharge system is provided for providing separate and uninterrupted flow paths for the filtrate from the filter tank to a storage tank.

9 Claims, 4 Drawing Figures

FILTRATE DISCHARGE SYSTEM FOR PRESSURE FILTER

The present invention is directed to new and useful improvements in pressure filters and more particularly to pressure filters used for the continuous filtering and thickening of liquid solid suspensions.

Pressure filters used for the continuous filtration and thickening of a suspension of solids or slurry feed thereto under pressure to produce a filtrate liquid and a pumpable thickened sludge are well known. Filters of this type are used for example in kraft pulp mill recausticizing systems for white liquor clarification and lime mud washing. In such filtration devices the operation is cyclical and controlled automatically. The slurry is fed under pressure into the filter tank and liquor is forced through suspended tubular filter elements which comprise perforated tubes having filter socks covering the outer surface thereof and to which surface adheres the lime mud filter cake.

The clarified liquor enters a filtrate chamber located in the upper portion of the tank above the filter elements which comprises a plurality of radially segmented filtration compartments. The liquor is then usually discharged from the segmented compartments from individual outlets to a common bustle pipe or overflow launder in which the liquor is mixed and directed to a head box located above the tank from which the liquor flows by gravity to a pipe discharge to a storage tank.

The filter tank is also provided with a removable cover or dome in order to permit access to the filtrate compartments for removal and inspection of the filter elements. It is known in filters of this type to position the filtrate outlets from the filtrate compartment immediately above the plate supporting the filter elements. A pressurized air cushion is established in the filtrate chamber beneath the dome to assist in the cake discharge operation which is initiated by operation of a sump pump to cause a rapid fall of pressure in the lower part of the filter. As the air cushion in the filtrate chamber expands the filtrate is forced back through the filter elements at a high flow rate to remove the cake therefrom for discharge through the sump outlet at the tank bottom.

In order to isolate or close off the filtrate from a filtrate compartment should a filter element become clogged or damaged to thereby alter or cloud the liquor discharge from the tank, shut-off valves are usually provided between the filtrate compartments and the common discharge bustle pipe. In addition to the difficulty in locating and isolating affected compartments, the large number and location of the shut-off valves in the flow path of the filtrate discharge requires the filter element supporting plate to be reinforced and the cover clamped to the tank by a large number of clamps to meet the full pressure rating of the feed input pressure to the tank which is in the range of 350 kPa.

It is an object of the present invention to provide novel low pressure filter and thickening device having a novel filtrate discharge system.

It is another object of a novel filtrate discharge system for a multi-filtrate compartment which includes means providing an uninterrupted flow path from the filter to the storage tank.

It is a further object to provide a novel pressure filter having a plurality of filtrate compartments wherein a selected compartment can be readily isolated from the remaining compartments in the event of a defective or leaking filter element.

A still further object is to provide a pressure filter having a filtrate discharge system which requires a low pressure rating for the tank housing elements or components resulting in reduced costs in manufacture and assembly procedures.

SUMMARY OF THE INVENTION

The present invention contemplates a novel low pressure filtration and thickening device. In one embodiment the device includes a tank having a slurry feed inlet for supplying a solids suspension to the tank under pressure. A horizontal plate member is positioned in the upper portion of the tank and has a plurality of hollow elongated filter elements depending therefrom. A plurality of radially sectionalized filtrate receiving compartments are provided above the plate. In a filtration mode of operation the liquor is fed to the tank under pressure and forced through the filter elements into the filtrate compartments while cake adheres to the outer surface of the filter elements. Each filtrate compartment is provided with a vertical discharge pipe connected to a filtrate outlet for leading the filtrate directly from the compartment to a head box without any flow restricting valves in the flow path.

The above and other objects and advantages of the present invention will appear more fully hereinafter from a consideration of the detailed description which follows taken together with the accompanying drawing wherein one embodiment of the present invention is illustrated.

DETAILED DESCRIPTION

Figure 1:
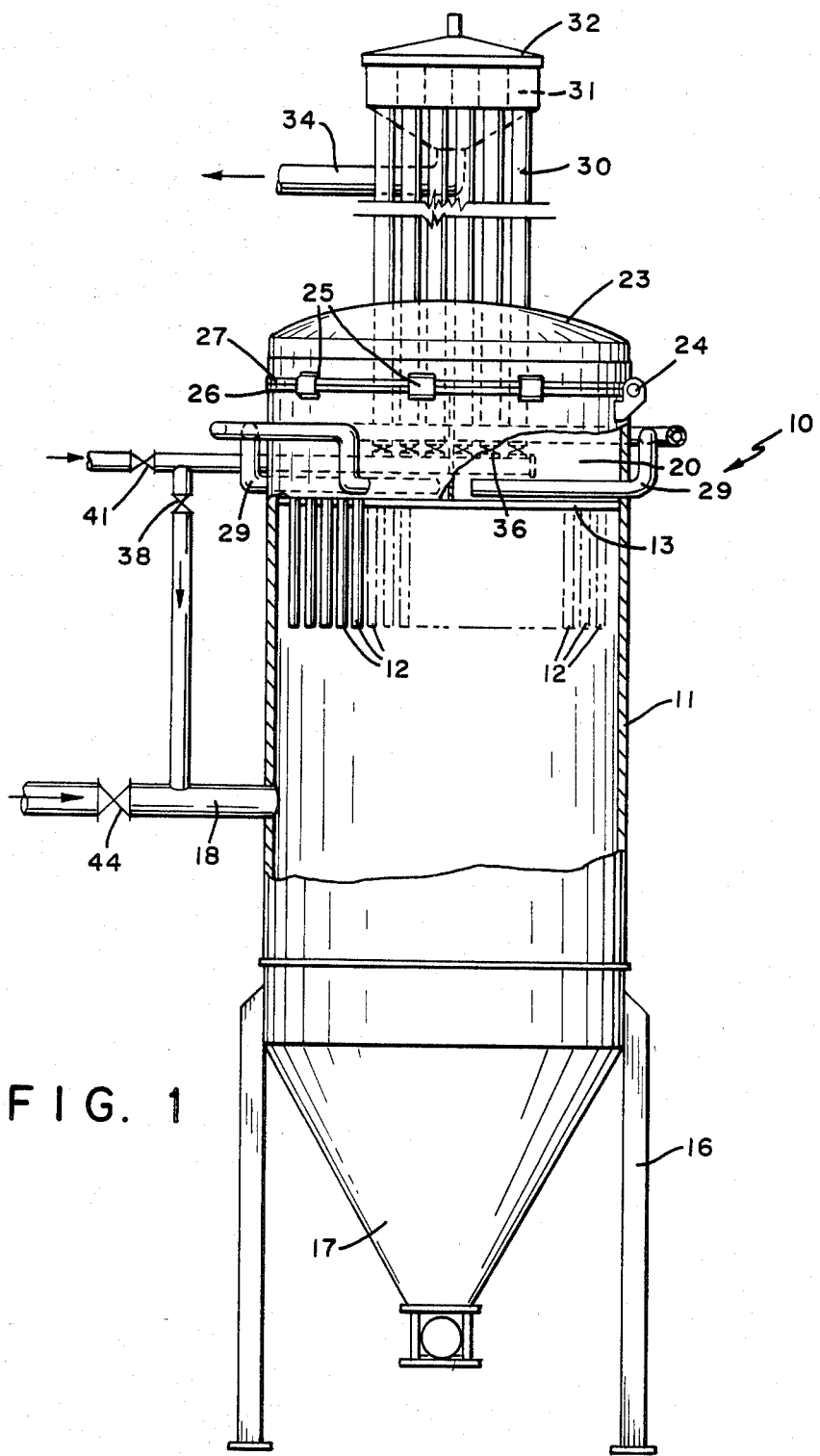
FIG. 1 is an elevational schematic illustration of a pressure filter incorporating one embodiment of the present invention with parts thereof broken away to disclose the interior thereof.
Figure 2:
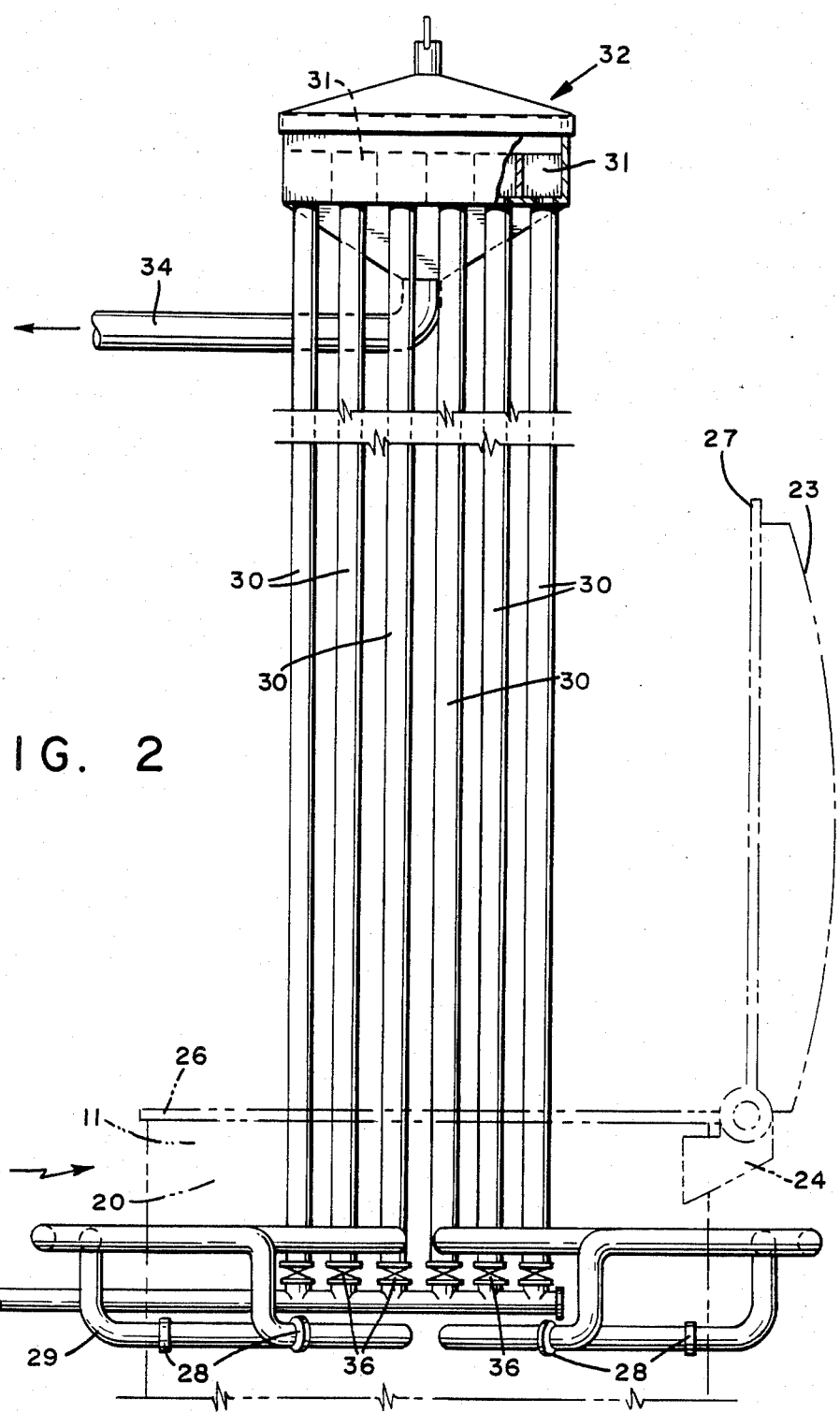
FIG. 2 is an enlarged elevational view of the upper portion of the pressure filter and filtrate flow discharge system.

Referring now to the drawings for a more detailed description of the present invention, a pressure filter incorporating an embodiment of the present invention is generally indicated in reference numeral 10 in FIGS. 1 and 2. Filter 10 comprises a cylindrical tank 11 constructed of stainless steel having a typical size range from a diameter of 1.8 meters and height of 9 meters to a diameter of 3 meters and a height of 10.3 meters.

A plurality of filter elements 12 are suspended in a known manner from a cylindrical support plate located at the upper portion of tank 11. Each filter element 12 is also of a well known construction and comprise a perforated metal tube which is covered with a permeable sock (not shown) such as made from needled felt material. Tank 11 is mounted on a support stand 16 and is provided with a conically shaped filter cake discharge sump 17 and a feed slurry inlet pipe 18 in the sidewall thereof.

Figure 3:
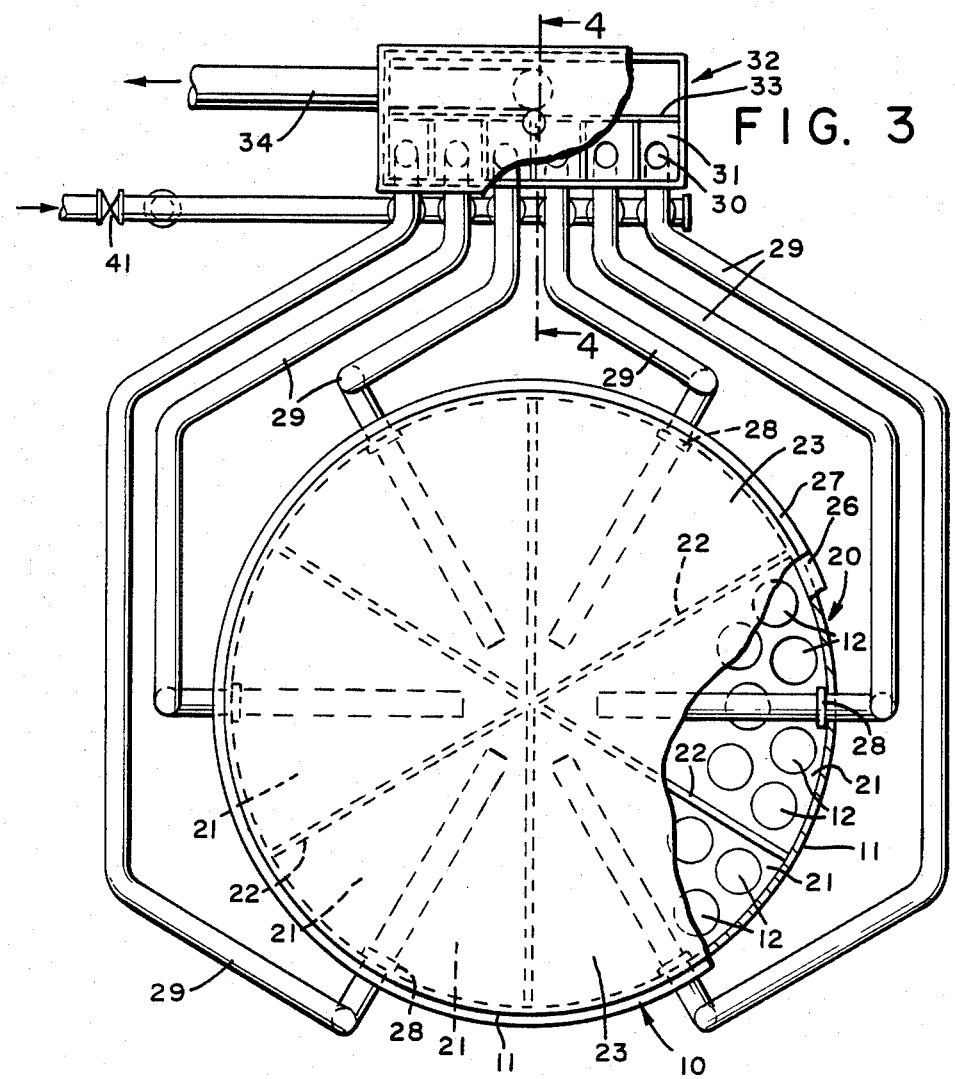
FIG. 3 is a plan view of the filter of FIG. 1 with portions of the filter and head box housings broken away to show interior portions thereof.
Figure 4:
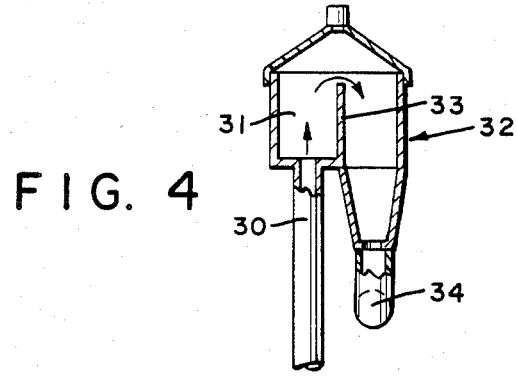
FIG. 4 is a sectional view taken on the line 4—4 of FIG. 3.

A filtrate chamber generally indicated by the reference numeral 20 in FIGS. 1 and 3 is located above filter element support plate 13 and comprises a plurality of radially sectionalized filtrate receiving compartments 21 which are formed and separated one from the other by radially arranged divider panels 22 which have lower edges secured to plate 13 and upper edges in sealing engagement with the undersurface of tank cover or dome 23. Tank cover 23 is removably mounted to the upper portion of tank 11 by a hinge 24 and locked thereto by a series of releasable clamp members 25 secured to mated flanges 26 and 27 of cover 23 and tank 11. When clamps 25 are removed cover 23 is swingable about hinge 24 to the open position shown in phantom in FIG. 2 to provide access to filtrate chamber 20.

As mentioned it is a feature of the present invention to provide a novel filtrate discharge system for filtrate compartments 21. To this end each filtrate compartment 21 is provided with a filtrate outlet 28 each connected to a separate individual discharge pipe 29. Each discharge pipe 29 extends about tank 11 (FIG. 2) to a position whereat each pipe 29 is connected to a vertical riser pipe 30. Pipes 30 are arranged in side by side relationship and ascend vertically in spaced and parallel relationship to each discharge to a separate box 31 in a head box 32. Head box 32 is mounted approximately fifteen feet above tank 11 and is provided with a central divider plate 33 which functions as a weir plate over which flows filtrate liquor from boxes 31 to a common discharge pipe 34 connected to head box 31 and leading to a liquor storage tank (not shown).

As seen in FIGS. 2 and 3 common header pipe 35 is provided beneath the connections of pipes 29 to riser pipes 30. Header pipe 35 has flow path connections to each riser pipe 30 separated therefrom by a plurality of normally closed valves 36 one of which is provided for each of said pipes 30. Header 35 also has a pipe connection to feed inlet pipe 18 for tank 11 (FIG. 1) and a normally closed valve 38 in the flow path therebetween. Header pipe 35 also provides a feed pipe for acid for cleaning of the filter elements the flow of which is controlled by valve 41.

In operation of filter 10 as for example as used for pressure filtration of a slurry for white liquor clarification and lime mud washing in a paper mill recausticizing system the feed liquor is fed to tank 10 through inlet 18 under a pressure of approximately 350 kPa. The liquor is forced through filter elements 12 whereby a filter cake consisting of lime mud forms on the outer surface of elements 12. Clarified liquor enters the filtrate chamber 20 from elements 12 to partially fill individual filtrate compartments 21 and is directed outwardly through filtrate outlets 28 to its associated filtrate pipes 29–30 to boxes 30 in head box 31 from which filtrate overflows weir 32 for discharge through pipe 34 to a storage tank (not shown).

The positioning of filtrate outlets 18 immediately above filter element support plate 13 establish a pressurized air cushion between the upper level of the filtrate in chamber 20 and dome cover 23 with the pressure determined by the elevation of head box 35. The cake discharge from elements 12 is initiated by closing of a feed valve 44 and operating a sump pump (not shown) causing a rapid fall of pressure in the lower part of tank 11. The air cushion expands and filtrate pipes 29 and compartments 21 discharge a backflow of liquor from head box 31 via pipes 29–30 for removing the filter cake from filter elements 12 for discharge through sump 17 in a usual manner.

If a filter element is damaged it will cause solids to enter its associate filtrate compartment 21 to mingle with the clarified pure liquor filtrate from the other compartments 21 in the overflow head box 32. In accordance with the present invention a compartment 21 from which a clouded filtrate is discharged is clearly identified by the clouded flow in its associated box 31 in head box 32. By opening the associated valve 36 in the riser pipe 30 for the identified compartment 21 the flow of filtrate therefrom is interrupted and returned via head pipe 35 upon opening of valve 41 to the feed inlet 18 to tank 11. Alternatively a sight glass (not shown) may be used in each pipe 30 for identifying a cloudy discharge.

It will be apparent from the foregoing description that the novel filtrate discharge system has many advantages in use. One advantage is that the flow from a filtrate compartment having a damaged filter element can be easily identified and the flow interrupted without disturbing the discharge flow of the other compartments 21. The replacement or cleaning of the damaged or adversely affected filter element 12 can be postponed until such time as shutdown periods are required without interrupting treatment of the process stream.

It is also an advantage of the present invention that by locating valves 36 beneath the connection of discharge pipes 29 to riser pipes 30 an uninterrupted flow path of filtrate from the filtrate compartments 21 to the head box 32 is effected. As a result the filter element support plate 13 and tank dome or cover 33 may be made to lower pressure ratings e.g. an ASME code operable at a 50 kPa rating rather than at a 350 kPa rating where the discharge flow from the filtrate compartments is restricted by excessive valves and the like. Further, in view of the lower pressure rating it has been found that fewer clamps are required for holding dome 23 to tank 11.

It is expressly understood that the present invention is not limited to the embodiment illustrated and described. Various changes can be made in the design and arrangement of parts without departing from the spirit and scope of the invention as the same will now be understood by those skilled in the art.

What is claimed is:

1. In a filtration device for filtering a liquid from a solids slurry solution and concentrating a solids underflow therefrom, a cylindrical tank housing a plurality of filter elements suspended from a support plate, a filtrate chamber above said support plate and comprising individual filtrate compartments each for receiving filtrate from a selected number of said filter elements, and said filtrate compartments separated one from the other within said filtrate chamber by radially arranged panel members mounted on said support plate, a filtrate discharge system for said device comprising, (a) a filtrate discharge outlet from each of said filtrate compartments at the periphery of said cylindrical tank, (b) filtrate collecting means located outside said tank for receiving filtrate under pressure from said filtrate compartments and including a pressure head box mounted above said tank, (c) a plurality of filtrate receiving boxes provided in said pressure head box equal in number to the number of said filtrate compartments in the filtrate chamber, (d) a separate flow pipe connection between each of said filtrate discharge outlets and a filtrate receiving box in said head box, and (e) valve means for each of said flow pipe connections for opening or closing the flow path between a selected filtrate compartment and its associated filtrate receiving box.

2. The device of claim 1 wherein a divider wall is provided in said head box common to all of said filtrate receiving boxes and over which divider wall the filtrate is discharged from said head box.

3. The device of claim 2 wherein said separate flow pipe connections between said filtrate compartments and said head box comprise a pipe from each of said discharge outlets each extending about the outer periphery of said tank and connected to riser pipes arranged spaced and parallel to each other adjacent to the outer wall of said filter tank.

4. The device of claim 1 wherein said cylindrical tank is provided with a removable dome cover and wherein said radially arranged panel members have lower edge portions mounted on said filter element support plate and upper edge portions in sealing engagement with the undersurface of said dome cover in closed position thereof to prevent flow of filtrate between adjacent filtrate compartments in said filtrate chamber.

5. The device of claim 4 wherein a pressure air cushion is formed in said filtrate chamber beneath said dome for backwashing said filter elements.

6. The device of claim 5 wherein said riser pipes extend vertically in side-by-side relationship to each discharge in a separate filtrate receiving box in said pressure head box.

7. The device of claim 6 wherein said valve means comprise a horizontal header pipe is provided beneath said points of connection of said filtrate outlet discharge pipes and said riser pipes, said header pipe having separate flow pipe connections with each pair of said discharge and riser pipes and wherein a control valve is provided in each of said flow pipe connections.

8. The device of claim 7 wherein said header pipe has a second flow pipe connection with the feed inlet to said filter tank to provide a flow path from any one of said filtrate receiving boxes to said inlet upon opening of its associated control valve member.

9. The device of claim 6 wherein said head box is positioned at an elevation sufficient to discharge said filtrate from said filtrate receiving boxes through to said filtrate compartment to backwash the filter element upon release of the pressure air cushion in said filtrate chamber.

* * * * *